United States Patent
Randazzo et al.

(10) Patent No.: US 6,183,188 B1
(45) Date of Patent: *Feb. 6, 2001

(54) MANUALLY OPERATED WORK PALLET CHANGER SYSTEM

(76) Inventors: Steven J. Randazzo, 1210 Golden Oak Way, San Jose, CA (US) 95120; Mario F. Solorio, 1468 Myrtle Ave., San Jose, CA (US) 95118; Hao Wu, 6919 Sessions Dr., San Jose, CA (US) 95119

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/840,504

(22) Filed: Apr. 21, 1997

(51) Int. Cl.$^7$ .................................................. B66C 23/00
(52) U.S. Cl. .................. 414/744.5; 29/33 P; 198/346.1; 269/20; 269/14
(58) Field of Search ................. 414/749, 749.1, 414/749.5, 749.4, 744.4, 744.5; 269/13, 14, 20, 71, 289 MR; 29/33 P; 198/346.1, 345.3

(56) References Cited

U.S. PATENT DOCUMENTS

| | | | |
|---|---|---|---|
| 4,326,831 | * | 4/1982 | Bergman .............................. 269/20 X |
| 4,498,571 | | 2/1985 | Nomura et al. ....................... 198/339 |
| 4,538,950 | * | 9/1985 | Shiomi et al. .................... 414/749 X |
| 4,717,306 | | 1/1988 | Satake ................................... 414/222 |
| 4,797,052 | * | 1/1989 | Ohta et al. ......................... 29/33 P X |
| 4,832,170 | | 5/1989 | Takeuchi et al. .................... 198/346 |
| 5,018,617 | | 5/1991 | Miyata et al. ..................... 198/346.1 |
| 5,099,980 | * | 3/1992 | Babel ............................... 29/33 P X |
| 5,156,254 | | 10/1992 | Kitamura et al. ..................... 198/346 |

OTHER PUBLICATIONS

Midaco's "Side by Side" Pallet System, sales brochure and specifciation, Midaco Corp., 2000 East Toughy Ave., Elk Grove Village, Illinois 60007.

The Siegel Rotary Pallet System, sales brochure, Siegel Systems Div., Macro Tool & Machine Co., Inc., 361 Route 55, LaGrangeville, NY 12540.

The Siegel Shuttle Pallet System, sales brochure, Siegel Systems Div., Macro Tool & Machine Co., Inc., 361 Route 55, LaGrangeville, NY 12540.

* cited by examiner

Primary Examiner—Donald W. Underwood
(74) Attorney, Agent, or Firm—Robert Buckley

(57) ABSTRACT

A manually operated pallet changer system for use with automatic machine tools includes a pallet changer and a compatible machine tool mounted pallet receiver. The pallet changer includes a massive, floor supported base to which a cantilevered first platform is pivotally attached for rotation between a pallet-exchange position and a work-setup position. A second platform rests atop the first platform and supports a pair of work pallet guides. The two platforms are rotatably attached near their centers so that the pallet guides can be interchanged by rotating the upper platform about its center by 180°. The configuration permits the platforms to be rotated as a unit away from a machine tool to the work-setup position. Work pallets are assembled and then the platforms are rotated together into the pallet-exchange position in which one of the pallet guides is aligned for transferring a work pallet to the machine tool mounted pallet receiver. The receiver includes an air bearing upper surface for simplifying the movement and positioning of a work pallet, a deployable clamping plate, and a pair of retractable locating pins for engaging openings on the underside of a work pallet to insure precision alignment during a machining operation.

18 Claims, 5 Drawing Sheets

FIG.−1

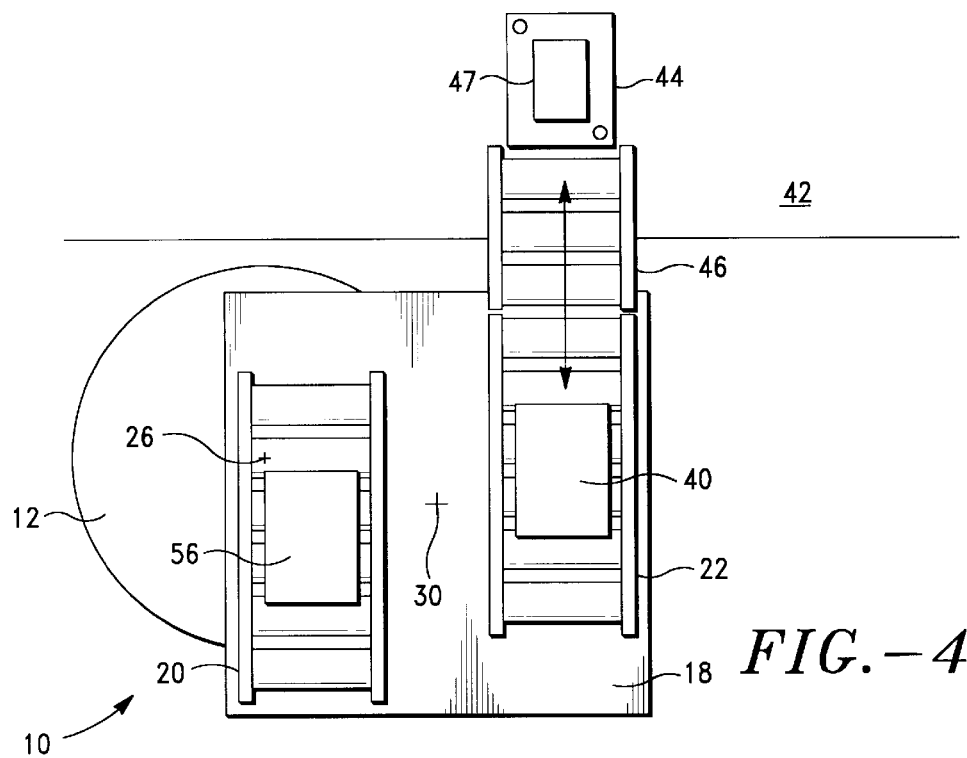
*FIG.—4A*
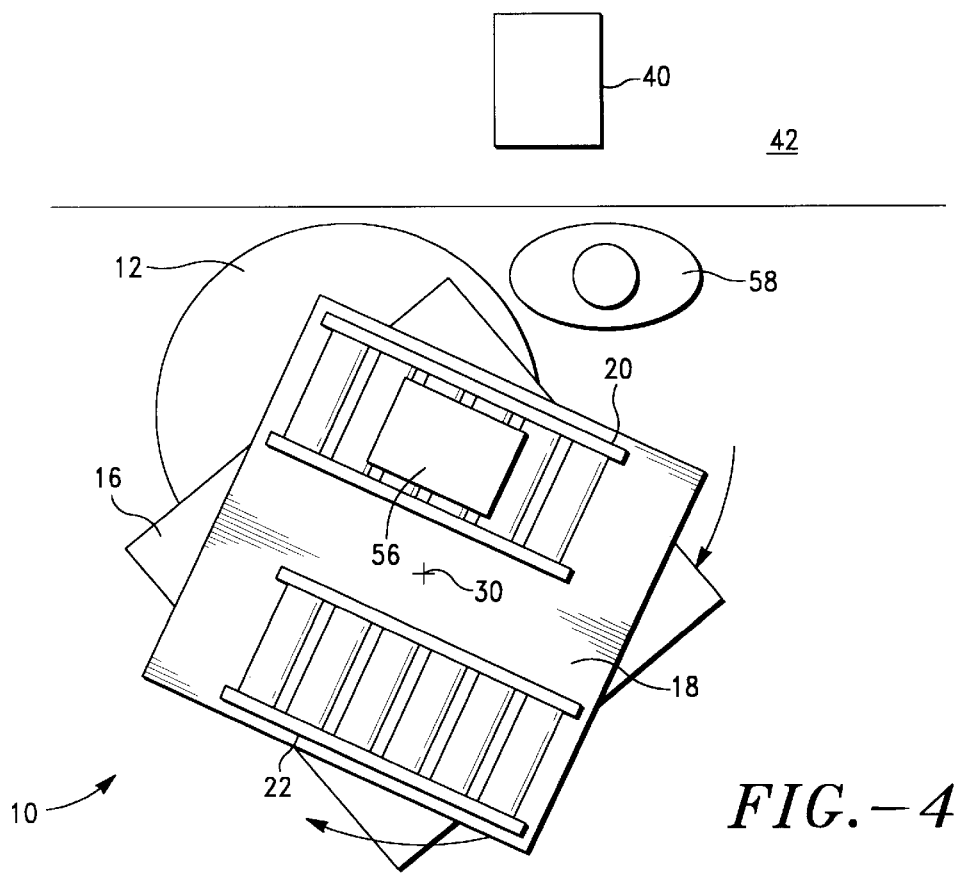
*FIG.—4B*

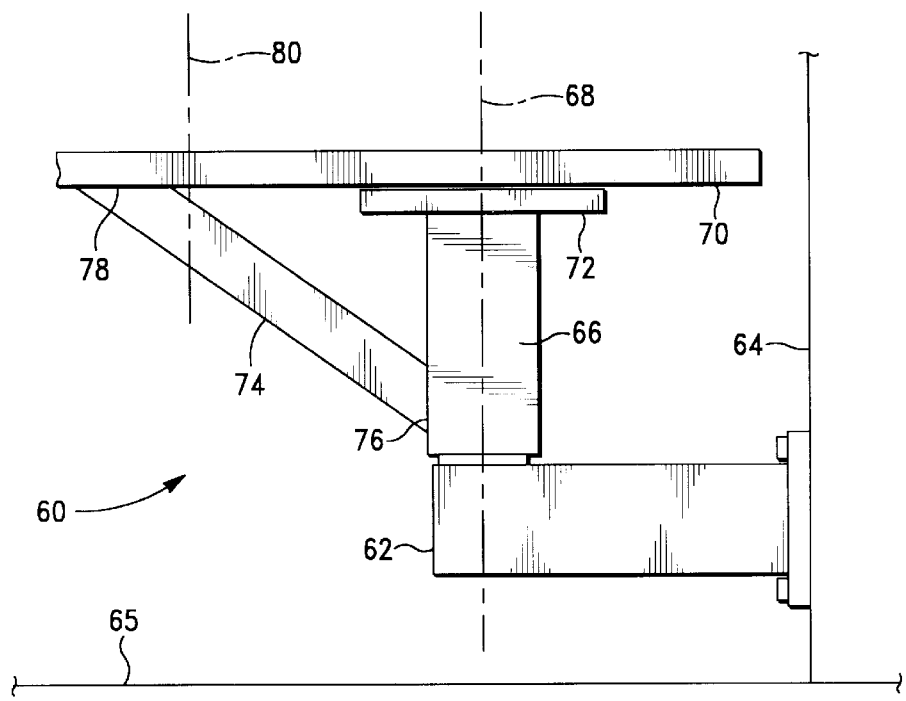
FIG.-5
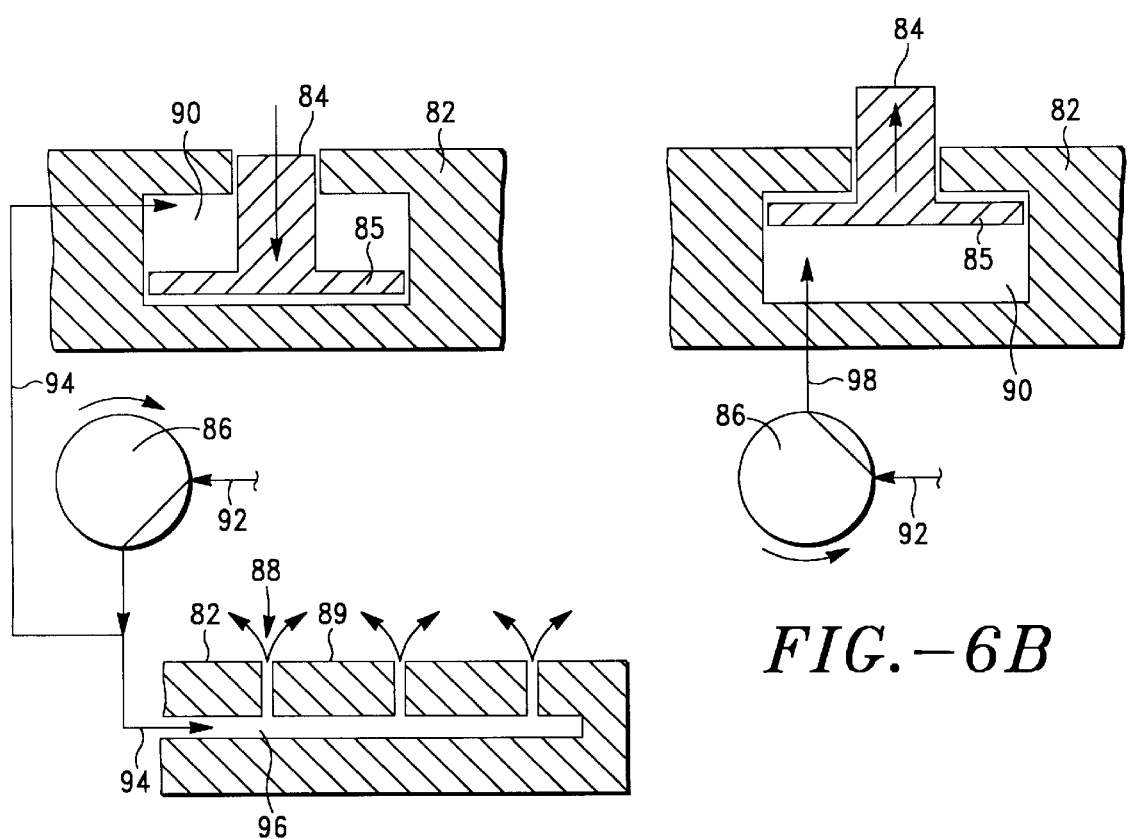
FIG.-6B
FIG.-6A

MANUALLY OPERATED WORK PALLET CHANGER SYSTEM

BACKGROUND

1. Field of the Invention

The invention relates to a work pallet changer, and in particular to a manually operated work pallet changer system.

2. Background of the Invention

In machine shops using large, expensive automatic machine tools, such as the Vertical Machining Center, the Horizontal Machine Center, and Drilling and Tapping machines, it is desirable to keep the machine tool busy in order to make it an effective and efficient investment. Many machine shops have adopted the use of work pallet changers also known as pallet indexers. The use of a pallet indexer permits a machine tool operator to assemble the work on portable pallets and to efficiently move the work to and from a machine tool work table by transferring assembled work pallets. This procedure avoids unnecessary downtime otherwise required to setup and teardown the work directly on the work table.

Using such an indexer, a new work pallet is setup off line while the machining proceeds on a previously assembled work pallet. The indexer is then used to quickly remove a pallet and its completed work from the machine tool and to replace it with the newly setup work pallet. The machine tool is inoperative only during the short time required to exchange the work pallets. In this way the machine tool is kept busy, and the owner's investment is maximized.

A variety of devices and methods have been proposed for this purpose. Among these devices are a class of pallet indexers which operate on a shuttle or side-by-side principle, as for example the pallet changer illustrated in U.S. Pat. No. 5,156,254. Another popular class of pallet indexers uses a rotary or carousel principle, as illustrated for example in U.S. Pat. No. 5,018,617.

Some indexers are manually operated, while many others are semi-automatic or even fully automatic in operation. Though these pallet indexers achieve the goal of keeping the machine tool busy, they tend to suffer from two major problems which undermine the goal of maximizing the owner's investment.

The first problem relates to the manner in which the side-to-side indexers interfere with a machine tool operator's ability to physically monitor the work in progress. These shuttle-type indexers often include a portion connecting two side units. That portion extends outwardly from the machine tool near a position at which the machine tool operator must stand in order to effectively observe and monitor the machining operation. In such cases, the machine tool operator must lean across this connecting portion in order to observe and listen to the work as it proceeds. Though it is possible for the machinist to work in this manner, the leaning-across increases fatigue and interferes with both his efficiency and his ability to use skills effectively to insure the machining is properly carried out. This shortcoming tends to be present in both the manually operated and the automatic indexers of the side-to-side configuration.

The second common problem relates to the complexity of the automatic and the semi-automatic indexers, and even many of the manually operated devices. These indexers are expensive to purchase and are often costly to maintain. What is gained in efficient machine shop operation, is lost in an increased, and often hidden cost for indexer maintenance and repair. As a result, the apparent savings are somewhat illusory, particularly in the smaller and mid-sized machine shop.

It would be desirable to provide a work pallet changer that is relatively inexpensive to purchase, that provides an increase in productivity by being easy to operate, that is configured to permit the machine tool operator to monitor the work without undue fatigue, and which presents the shop owner with few hidden costs related to upkeep.

SUMMARY OF THE INVENTION

The present invention meets these requirements by providing a manually operated work pallet changer providing simple handling for a pair of work pallets. The pallet changer is inexpensive, is easy to install and to adjust, is easily maintained, and rotates out of the machinist's way once a work pallet exchange is completed.

In a specific embodiment of one aspect of the invention, a manually operated work pallet changer includes a heavy, floor supported base. A horizontal platform is pivotally attached to the base, and defines a primary vertical axis extending through the center of the base. The horizontal platform rotates, with respect to the base and the primary axis, between a work pallet-setup position and a work pallet-exchange position. The horizontal platform extends outwardly from the primary axis in cantilever fashion. The outwardly extending portion of the platform includes a bearing which defines a second vertical axis parallel to the primary axis. A generally rectangular pallet guide platform is rotatably attached at the bearing, above and parallel to the horizontal platform, and is thus able to rotate around the secondary axis. A pair of work pallet guides are aligned in opposite directions on top of the pallet guide platform.

Rotation of the pallet guide platform about the secondary axis by 180° brings first one and then the other work pallet guide into the work pallet-exchange position. Pivoting the horizontal platform around the primary axis shifts the pallet guide platform between the work pallet-exchange position and the work pallet-setup position, away from the machine tool.

In a specific embodiment of another aspect of the invention, an air-bearing work pallet receiver includes a planar top surface having a plurality of small openings connected through an automatic valve to a compressed gas. When the valve is opened, the gas is ejected through the small openings, forming an air-bearing surface which floats the heavy work pallets and facilitates their movement and careful alignment on the machine tool. The receiver also includes a deployable clamping plate which mates with a congruent opening formed on the underside of the work pallet. Once the deployed clamping plate has engaged the opening, the work pallet is retained against the lift of the air-bearing and is coarsely aligned atop the work pallet receiver. Finally, the receiver includes a pair of retractable locating pins which are withdrawn below the air-bearing surface while a work pallet is being moved and adjusted, and which are then extended into corresponding openings on the underside of the work pallet providing a precise and repeatable alignment during the machining operations. The clamping plate is then moved from a deployed receiving position to a work pallet clamping position.

In another embodiment of the invention, a manually operated work pallet changer system includes a pallet changer and an air-bearing work pallet receiver, as described above.

BRIEF DESCRIPTION OF THE DRAWINGS

For a further understanding of the objects, features and advantages of the work pallet changer system, reference should be had to the following description of the preferred embodiment, taken in conjunction with the accompanying drawing, in which like parts are given like reference numerals and wherein:

FIG. 4A is a plan view showing the pallet changer of FIG. 1 rotated into a pallets exchange position.

FIG. 4B is a plan view showing the pallet changer in a work-setup position and the upper pallet guide member being rotated by 180° to exchange pallet guides.

FIG. 5 is a side view of an alternative embodiment of the work pallet changer adapted for mounting on the side of a machine tool.

FIG. 6A is a schematic diagram illustrating the use of a valve to activate the air-bearing surface and to retract the locating pins of the work pallet receiver of FIG. 3.

FIG. 6B is a schematic diagram illustrating the valve operated to deploy the locating pins and to deactivate the air-bearing surface.

DESCRIPTION OF THE PREFERRED EMBODIMENT

Figure 1:
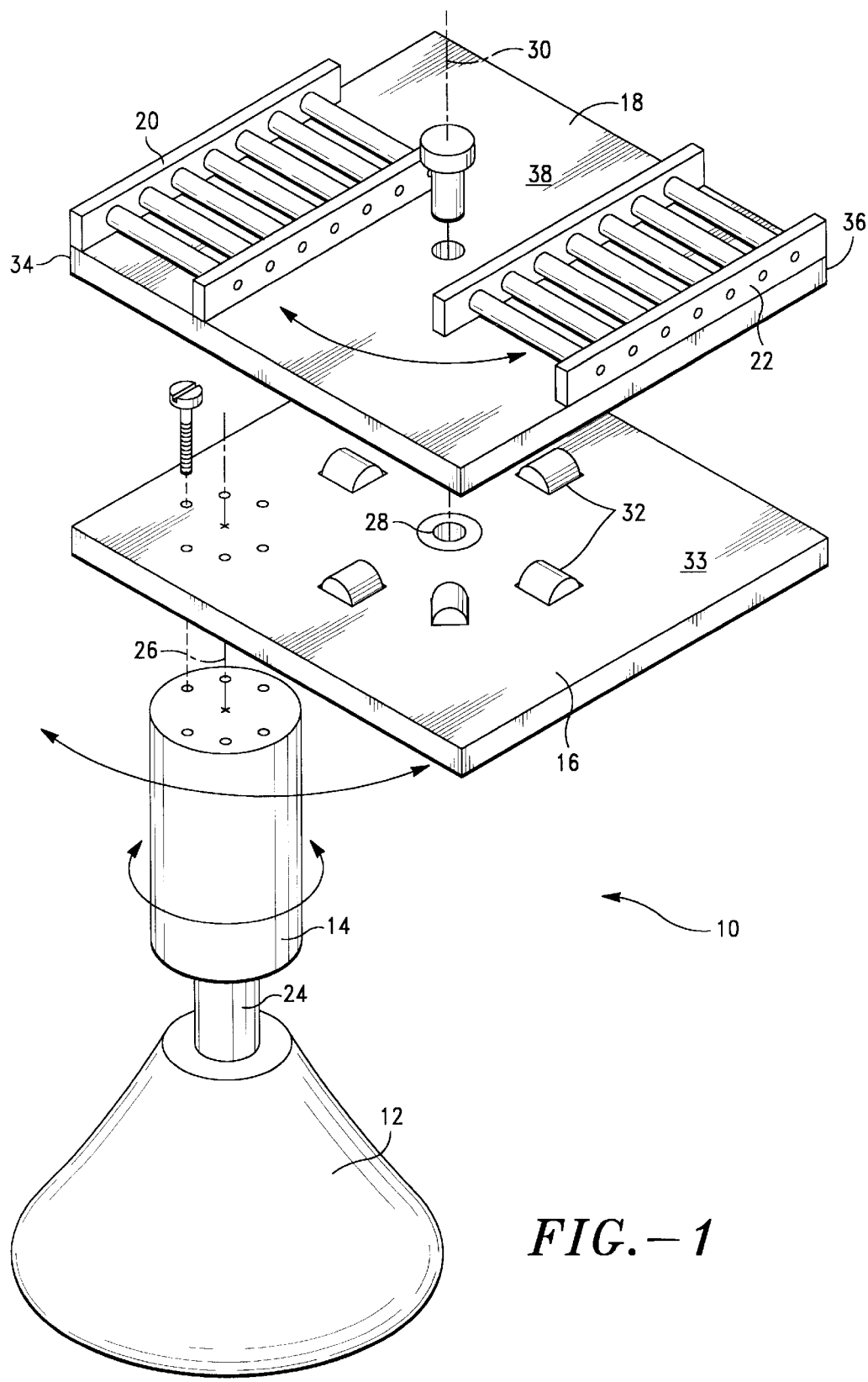
FIG. 1 is an exploded perspective view of a preferred embodiment of the manually operated pallet changer in accordance with one aspect of the present invention.

With respect to FIG. 1 there is shown an exploded, perspective view of a manually operated work pallet changer according to a preferred embodiment of one aspect of the present invention. The manually operated pallet changer is designated generally by the numeral 10 and includes a static base mount 12, a pivoting base member 14, a primary support member 16, a guide support member 18, and a pair of work pallet guides 20 and 22.

The static base mount 12 is a massive support intended to rest upon a floor and to provide stability for the pallet changer 10. The static base mount 12 includes an upwardly extending shaft 24 for rotationally supporting the pivoting base member 14. Bearings (not shown) are located within the pivoting base member 14 for permitting rotation about the shaft 24 and defining a primary index axis 26 which is essentially vertical.

In a specific embodiment of the pallet changer 10, the static base mount 12 is circular at the base, having a diameter of 24 inches. The static base mount 12 weighs approximately 100 pounds. The upwardly extending shaft 24 has a diameter of approximately 2.25 inches, and the bearings (not shown) which connect the pivoting base member 14 to the shaft 24 are two tapered roller bearings, one near the lower end of the shaft 24, the other near the upper end, and providing both thrust and radial stability.

The primary support member 16 is essentially a square platform rigidly attached to an upper end of the rotating base member 14 and extending outwardly from the primary index axis 26. In a specific embodiment, the primary support member 16 measures 24 by 31 inches and is made of ⅝ inch drawn aluminum stock. The combination of the pivoting base member 14 and the primary support member 16 is sufficiently rigid to maintain the outwardly extending portion in a generally horizontal plane. In one alternative embodiment, a brace member extends between a lower portion of the pivoting base member 14 and the outwardly extending portion of the primary support member 16 (see FIG. 5).

A bearing 28 is located near the center of the primary support member 16 and defines a secondary axis 30 parallel to the primary index axis 26. In one embodiment, the bearing 28 is a tapered roller bearing of approximately 2 inch diameter. A series of horizontal load bearing members 32 are arranged in a circle surrounding and set apart from the bearing 28 on an upper surface 33 of the primary support member 16. In a specific embodiment, the load bearing members 32 are polyurethane caster wheels on steel axles. Eight such members 32 are disposed in a circle of about 20" diameter, centered around the bearing 28 and sitting in wells in the surface 33.

The guide support member 18 conforms in shape to the primary support member 16 and rests on top of the horizontal bearing members 32. The guide support member 18 is attached near its center to the bearing 28 so that the guide support member 18 is free to rotate in a horizontal plane about the secondary axis 30. The pair of work pallet guides 20 and 22 are aligned near opposed corners 34, 36 of an upper surface 38 of the guide support member 18. In a specific embodiment, the guide support member 18 measures 31 inches by 31 inches and is made of ⅝ inch drawn aluminum stock.

In general use, the static base mount 12 of the manually operated work pallet changer 10 is positioned on the floor near the work station of an automatic machine tool (not shown). The guide support member 18, and the primary support member 16 are rotated as a single unit about the primary index axis 26 between a pallet-exchange position near the machine tool, and a work-setup position away from the machine tool. In use, a pair of assembled work pallets waiting to be machined (not shown) are located one on each work pallet guide 20, 22. At the work-setup position, the guide support member 18 and the work pallet guides 20, 22 are rotated 180° about the secondary axis 30 to exchange the relative positions of the opposed work pallet guides.

Figure 2:
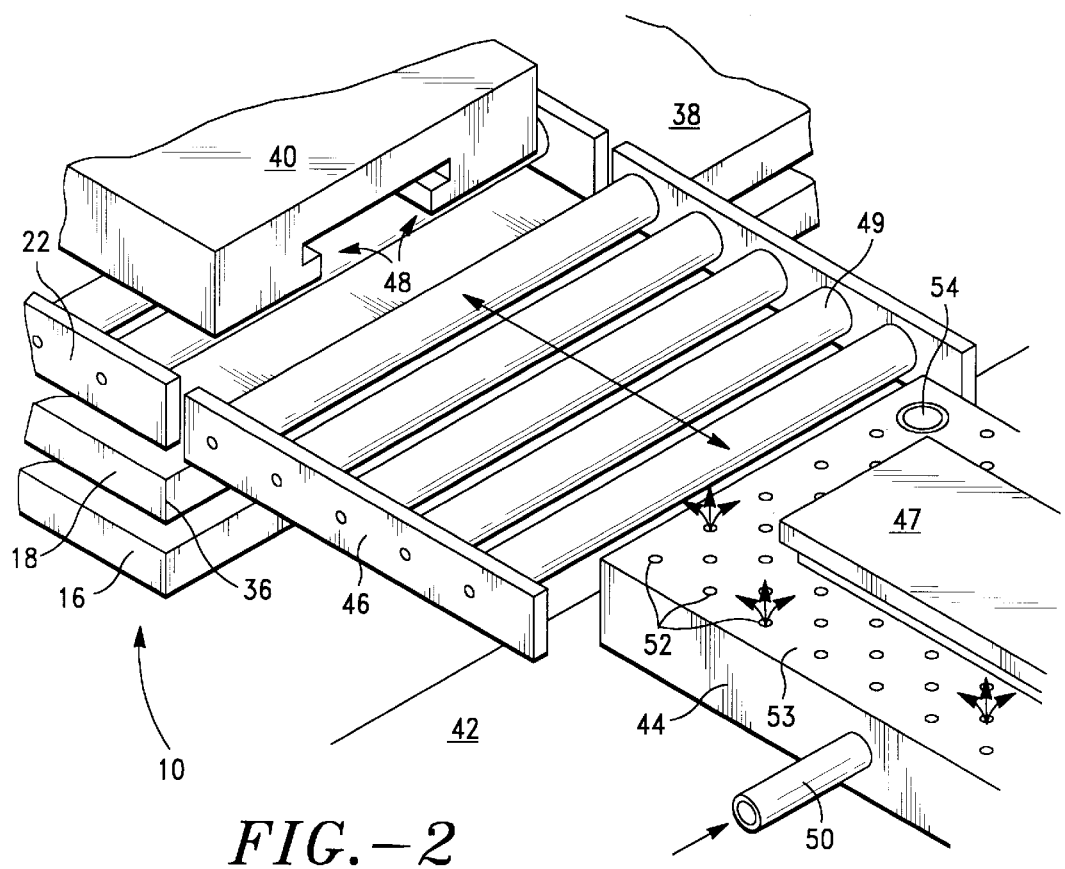
FIG. 2 is a partial perspective view illustrating use of a temporary guide bridge for transferring a work pallet between the manually operated pallet changer of FIG. 1 and a machine tool mounted work pallet receiver.

FIG. 2 is a partial, perspective view illustrating an exchange of a work pallet 40 between the manually operated pallet changer 10 and an automatic machine tool, which is designated generally by the numeral 42. An air-bearing work pallet receiver 44 is located at a work station atop the machine tool 42, and receives and clamps the work pallet 40 in place throughout the machining operations. In the illustrated embodiment, a short pallet guide bridge 46 is used to temporarily connect the pallet changer 10 with the work pallet receiver 44 during the work pallet transfer. The work pallet 40 is machined from type MIC-6 aluminum micro casting, available from Alcoa and Reynolds. The finished work pallet 40 measures 20 inches wide by 16 inches deep by 1.25 inch thick.

The work pallet receiver 44 includes a T-shaped deployable clamping plate 47 which engages a conforming clamping slot 48 formed on the underside of the work pallet 40 as the work pallet 40 moves across the guide bridge 46 and onto the work pallet receiver 44. The clamping slot 48 is formed on the underside of the work pallet 40 by machining, and the micro-cast aluminum is preferred because of its ability to maintain its flatness after the clamping slot 48 has been machined into its bottom side. During the work pallet transfer from the pallet changer 10 to the machine tool 42, the cooperation of the deployable clamping plate 47 with the conforming clamping slot 48 guides the work pallet 40 into position atop the work pallet receiver 44.

During the transfer, a compressed gas is inserted through a pipe 50 into a cavity (not shown) within the body of the work pallet receiver 44. The compressed gas is ejected through a plurality of small holes 52 located in an upper surface 53 of the work pallet receiver 44 creating an air-bearing for easing the movement of the heavy work pallet 40 during the transfer (an assembled work pallet may weigh as much as 200 pounds). In a specific embodiment, the compressed gas is air under 100 pounds pressure. The small holes are 0.050 inch in diameter and a typical air-bearing surface includes approximately 16 to 20 such holes. The surface 53 is generally planar.

The work pallet receiver 44 also includes a pair of retractable locating pins 54, located near opposite corners. These locating pins are retracted below the air-bearing surface 53 during a work pallet transfer and then are raised into corresponding openings which are formed in the lower surface of the work pallet 40 and provide a positive locating reference with respect to the defined machine tool work station. In a specific embodiment, the locating pins 54 are stainless steel, approximately 0.75 inch in diameter and extending approximately 0.75 inch above the surface 53 when fully deployed.

Figure 3:
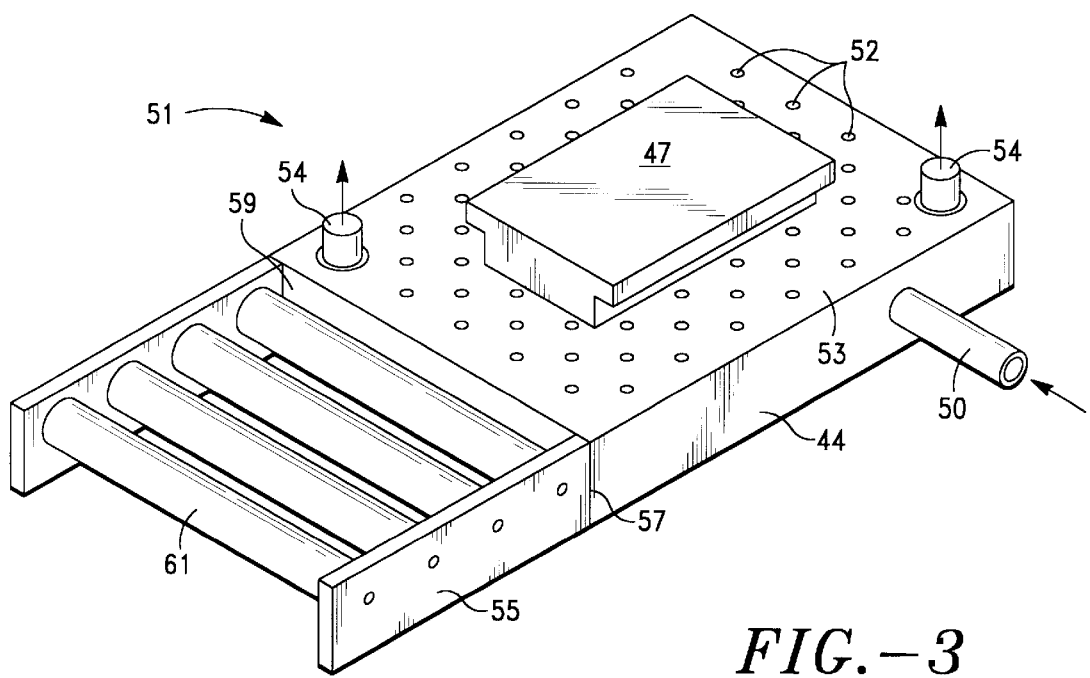
FIG. 3 is a top perspective view of a preferred embodiment of a work pallet receiver having an air-bearing surface, a deployable clamping plate, a pair of retractable locating pins, and an attached guide bridge assembly.

FIG. 3 is a perspective top view of a preferred embodiment of a work pallet receiver, designated generally by the numeral 51. The preferred work pallet receiver 51 differs slightly from the work pallet receiver illustrated in FIG. 2. In addition to the receiver 44, the air-bearing surface 53, the clamping plate 46, and the retractable locating pins 54, shown in a deployed position extending above the air-bearing surface 53, the preferred work pallet receiver 51 includes a guide bridge 55 having one end 57 permanently attached to a forward end 59 of the receiver 44. The attached guide bridge 55 includes a plurality of roller-type guide bearing members 61 made of 0.75 inch aluminum rods supported in polyurethane bushings at 2 inch centers. The same construction is used for the pallet guides 20, 22 of FIG. 1.

When the preferred work pallet receiver 51 is used with the manually operated work pallet changer 10, forming a work pallet changer system, the temporary bridge 46 of FIG. 2 is not required. Instead, the permanently attached bridge 55 extends from the air-bearing surface 53 and the forward end 59 to a forward edge of the machine tool 42. The static base mount 12 (FIG. 1) of the manually operated work pallet changer 10 is positioned such that the primary and guide support members 16, 18 (FIG. 2) can be rotated to bring one work pallet guide 22 (FIG. 2) into close proximity with the receiver guide bridge 55. The assembled work pallet 40 (FIG. 2) is then moved by hand along the work pallet guide 22 and onto the receiver guide bridge 55 (FIG. 3) and finally onto the air-bearing surface 53 for engagement with the deployable clamping plate 47.

In a preferred embodiment, the receiver guide bridge 55 does not extend beyond a front edge of the machine tool 42 into a space normally occupied by the machinist, and thus does not interfere with his monitoring of the machining operation. The advantage of the permanently attached guide bridge 55 of FIG. 3 over the temporary guide bridge 46 of FIG. 2 is that the attached guide bridge does not require a separate place for storage when not in use, and is less likely to become lost or damaged.

FIGS. 4A and 4B are plan views illustrating the exchange (FIG. 4A) and the setup (FIG. 4B) positions, respectively, of the manually operated work pallet changer 10.

FIG. 4A illustrates the work pallet changer 10 located adjacent the machine tool 42 so that the pallet guide 22 is aligned with the work pallet receiver 44. The primary support member 16 and the guide support member 18 are aligned with each other so that their square shapes are congruent and are rotated into the exchange position so that the pallet guide 22 is aligned with the work pallet receiver 44. A portion of the static base mount 12 extends beyond the support members 16, 18, and is located close to the machine tool 42 and to the left side of the work pallet receiver 44. A work pallet 40 is shown located on the pallet guide 22 and the temporary pallet guide bridge 46 connects between one end of the pallet guide 22 and the work pallet receiver 44. In this exchange position, the work pallet 40 can be manually shifted along the pallet guide 22 and the temporary guide bridge 46 onto the air-bearing surface of the work pallet receiver 44. The locating pins 54 are in the retracted position, and the clamping plate 47 is deployed into a receiving position. A second work pallet 56 is located on the pallet guide 20.

FIG. 4B illustrates the work pallet changer 10 with the primary support member 16 rotated approximately 60° in a clockwise direction away from the machine tool 42 and into a setup position. The guide support member 18 has been rotated approximately an additional 100° in the clockwise direction. The work pallet 40 has been transferred from the pallet guide 22 to the work pallet receiver 44. A machine tool operator 58 is now able to stand in the space between the rotated primary support member 16 and the machine tool 42, permitting the operator to closely observe the machine tool operation.

FIG. 5 is a side view illustrating an alternative embodiment of a manually operated work pallet changer, designated generally by the numeral 60. The pallet changer 60 includes a static machine mount 62 which is attached to one side of an automatic machine tool 64. A rotating base member 66 is pivotally attached to the static machine mount 62, defining a primary index axis 68. A primary support member 70 is connected to an upper end 72 of the rotating base member 66. A brace 74 extends between a lower end 76 of the rotating base member 66 and an outwardly extending portion 78 of the primary support member 70. In all other respects, the pallet changer 60 is essentially the equivalent of the preferred embodiment illustrated in FIG. 1.

FIGS. 6A and 6B are schematic diagrams illustrating the use of a valve and a compressed gas to retract and deploy the retractable locating pins and to activate and deactivate the air-bearing surface.

FIG. 6A includes a cross-sectional portion 82 of the work pallet, a locating pin 84 having a piston portion 85, a valve 86, a compressed gas 88 emitting from a plurality of small openings, an air-bearing surface 89, a piston chamber 90, a compressed gas source line 92, a compressed gas activation line 94, and an air-bearing chamber 96.

When the valve 86 is rotated into the position shown, the compressed gas at the source line 92 is permitted to pass into the activation line 94 and moves into the chamber 90 above the piston 85, and into the chamber 96, emitting from the small openings 88 to create an air-bearing surface 89. The piston 85 is driven toward the lower end of the chamber 90 causing the attached locating pin 84 to retract into the work pallet receiver 82.

FIG. 6B, the valve 86 has been rotated so that the compressed gas in the source line 92 is disconnected from the activation line 94 and is connected to a deploy line 98. The gas moves via line 98 into the chamber 90 below the piston 85, urging the piston 85 toward an upper end of the chamber 90 and extending the attached locating pin 84 above the surface 89 of the work pallet receiver 82.

Figure 7:
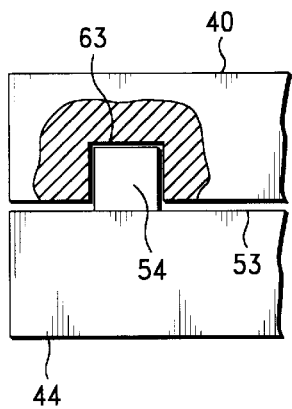
FIG. 7 is a cutaway end view illustrating a locating pin in a recess on the underside of a work pallet.

FIG. 7 is a cutaway end view showing the engagement of a deployed locating pin 54 within a compatible recess 63 in the underside of a work pallet 40. The locating pin 54 extends above the planar surface 53 of the work pallet receiver 44.

Figure 8:
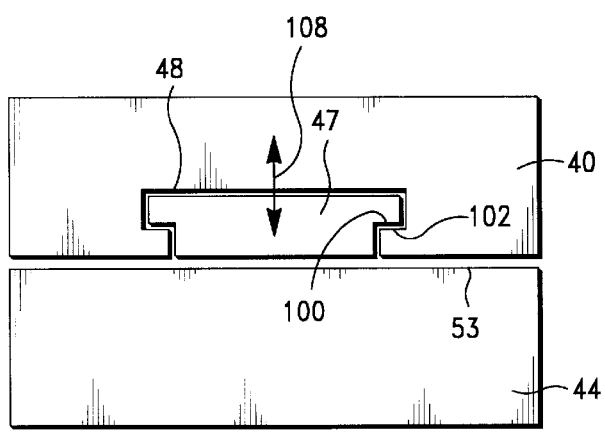
FIG. 8 is an end view illustrating detail of a deployable clamping plate and a conforming clamping slot.

FIG. 8 is an end view of a work pallet receiver 44 and a work pallet 40, illustrating engagement of the T-shaped deployable clamping plate 47 within the conforming clamping slot 48 on the underside of the work pallet 40. An overhanging ledge 100 of the deployable clamping plate 47 mates with a conforming undercut lip 102 of the clamping slot 48. The clamping plate 47 is movable a short distance both upward and downward in the vertical direction as indicated by the arrow 108.

When moved upward to the full extent of its short range of vertical motion, the clamping plate 47 defines a "receiving" position (also referred to as "open" and "unlocked" position). In the receiving position, the clamping plate 47 does not interfere with the conforming clamping slot 48, permitting the work pallet 40 to be moved easily onto and off of the work pallet receiver 44. When the air-bearing is activated, lifting the work pallet 40, the ledge 100 and the lip 102 cooperate to retain the work pallet 40 against the lifting force of the air-bearing.

When the clamping plate 47 is moved downward to the full extent of its vertical motion, the ledge 100 acts upon the lip 102, forcing the work pallet 40 down against the planar surface 53 of the work pallet receiver 44. This full downward position of the clamping plate 47 defines a "locked" (also "clamped") position. In the locked position, the work pallet 40 is locked against the planar surface 53 and does not move. Once the position of the work pallet 40 has been adjusted, and the locating pins 54 are deployed, the clamping plate 47 is moved to the locked position. The clamping plate must be moved back into the receiving position before the work pallet 40 can be readjusted or removed from the work pallet receiver 44.

Figure 9:
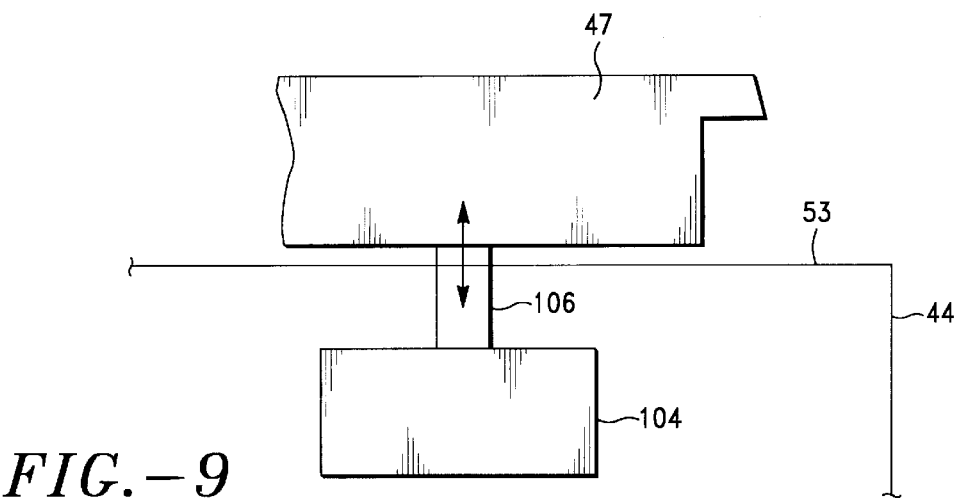
FIG. 9 is a schematic diagram illustrating an apparatus for deploying a clamping plate in a vertical direction.

FIG. 9 is a schematic diagram illustrating an apparatus 104, 106 for moving the deployable clamping plate 47 upward and downward between the "receiving" and the "locked" positions. A vertical activator 104 is connected to the deployable clamping plate 47 via a connector 106. In a specific embodiment, the combination 104, 106 is provided by a cam and cam follower. In another embodiment, the combination 104, 106 is provided by an eccentric member and an eccentric member retainer.

Figure 10:
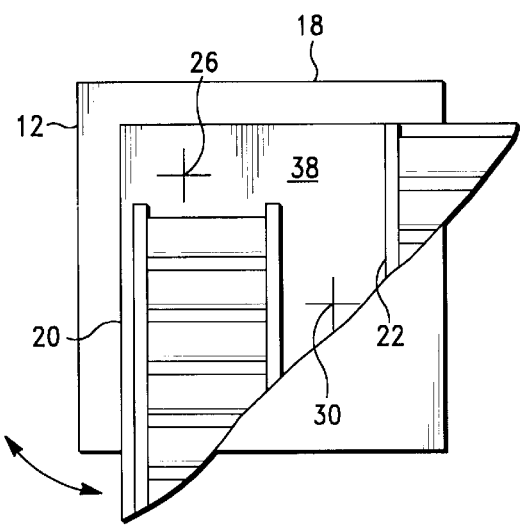
FIG. 10 is a partial plan view showing a rectangular static base member using corner placement of a primary index axis.

FIG. 10 is a partial plan view illustrating an alternative configuration for the static base mount 12 and primary index axis 26. The base 12 is essentially square and in a specific embodiment is bolted to the floor. The primary index axis is near one corner of the base 12, providing improved support for the cantilevered members. The remaining elements are shown to provide orientation with respect to FIG'S. 1, 2, 4A and 4B, and include the primary support member 16 (not visible), the guide support member 18, the pair of opposed pallet guides 20, 22, the secondary index axis 30, and an upper surface 38 of the guide support member 18.

We end by describing a method for using the manually operated work pallet changer and air-bearing receiver of the present invention. The method includes the following steps.

General Setup

Provide a manually operated pallet changer 10 such as that illustrated in FIG. 1. Position the pallet changer 10 with respect to a machine tool 42, as illustrated in FIG. 4A, so that the primary axis 26 is located to one side of the work station and so that the static base mount 12 is close to the machine tool.

Provide a pallet receiver 44 with an attached guide bridge 55 as illustrated in FIG. 3, and then attach the combined receiver-guide bridge 51 to the machine tool at the machine tool work station, as illustrated in FIG. 4A.

Provide at least one work pallet 40, such as the work pallet illustrated in FIG. 2, and place the work pallet on top of one of the work pallet guides 20, 22 as shown in FIG. 4A.

Rotate the primary support member 16 and the guide support member 18 as a single unit about the primary index axis 26 away from the front of the machine tool and into a work-setup position, as illustrated in FIG. 4B.

Work-piece Setup

Assemble work pieces on top of the work pallet 40 in an order required by the automatic machining process to be used. If a second work pallet 56 is available, place the second work pallet on top of the other work pallet guide, and assemble a second set of work pieces on top of the second work pallet. Rotate the guide support member 18 about the secondary index axis 30 as needed to provide access to each work pallet during the work-piece setup.

Pallet Exchange

Now that at least one work pallet includes assembled work pieces, rotate the guide support member 18 about the secondary axis 30 so that one work pallet guide 20, 22 will align with the air-bearing receiver 5 1 when the primary support member 16 and the guide Support member 18 are rotated as a single unit around the primary index axis 26 toward the front side of the machine tool 42, as illustrated in FIG. 4A.

Rotate the primary support member 16 and the guide support member 18 as a single unit about the primary index axis 26 toward the front of the machine tool so that one end of the one work pallet guide 20, 22 is in alignment with one end of the attached guide bridge 55 of the combined receiver-guide bridge 51.

Activate the air-bearing surface of the work pallet receiver by connecting a compressed gas to emit from the plurality of small openings in the surface. Cause the locating pins 54 to withdraw below the air-bearing surface, and deploy the clamping plate 47 to the receiving position.

Move the one assembled work pallet 40 along the work pallet guide 22 in the direction of the work pallet receiver. Move the work pallet 40 onto the attached guide bridge 55 and then onto the air-bearing surface, guiding the opening 48 along the underside of the work pallet 40 onto the deployable clamping plate 47.

Allow the air-bearing to support the assembled work pallet 40 while adjusting the position of the work pallet 40 into accurate alignment with the withdrawn locating pins 54. When the work pallet 40 is in the proper position on the receiver 44, deploy the locating pins 54 into the compatible openings in the bottom of the work pallet 40 and disconnect the compressed gas from the plurality of small openings to deactivate the airbearing, and move the clamping plate 47 into the locked position to secure the work pallet 40 at the machine tool work station.

Machining

When all adjustments of the work pallet 40 have been completed, rotate the primary support member 16 and the guide support member 18 as a single unit about the primary index axis 26 and away from the front of the machine tool to permit the machine tool operator 58 to monitor the machining operation.

Pallet Exchange

When the machining operations are complete, put the machine tool in a safe configuration and then rotate the primary and the guide support members as a single unit toward the front side of the machine tool so that the empty work pallet guide 22 (FIG'S. 4A and 4B) comes into alignment with the attached guide bridge 55 (FIG. 3).

Activate the air-bearing and cause the locating pins to be withdrawn below the air-bearing surface, and deploy the clamping plate 47, unlocking the completed work pallet 40.

Move the completed work pallet 40 from the receiver 44 across the attached guide bridge 55 and onto the aligned work pallet guide 22.

Now rotate the primary and guide support members 16, 18 about the primary index axis 26 and away from the front of the machine tool into the work setup position, as illustrated in FIG. 4B.

Rotate the guide support member 180° about the secondary index axis 30 so that the other work pallet guide 20 and assembled work pallet 56 are positioned for transfer to the machine tool. Now rotate the primary and guide support members 16, 18 as a single unit around the primary index axis 26 toward the front of the machine tool.

Activate the air-bearing, withdraw the locating pins 54 below the air-bearing surface, and deploy the clamping plate 47. Move the assembled work pallet 56 across the attached guide bridge 55 onto the receiver 44. Adjust the position of the work pallet 56. Cause the locating pins to deploy into the openings on the underside of the work pallet 56. Deactivate the air-bearing, and move the clamping plate 47 into the locked position. Rotate the primary and guide support members 16, 18 as a single unit around the primary index axis 26 away from the front of the machine tool. Begin another machining operation.

Work Setup

While the machining operation is ongoing, disassemble the previously machined work pieces from the work pallet 40 and reassemble new work pieces onto the same work pallet.

Continue the process with all the work has been completed.

While the invention has been described in relation to the embodiments shown in the accompanying Drawing figures, other embodiments, alternatives and modifications will be apparent to those skilled in the art. It is intended that the Specification be exemplary only, and that the true scope and spirit of the invention be indicated by the following Claims.

We claim:

1. A combination of a machine tool and a manually operated work pallet changer, comprising:

a machine tool having a work table and a front side defining a front of the work table;

a manually operated work pallet changer adapted for use with a machine tool for exchanging work pallets with the work table, the work pallet changer including, a support member defining a primary index axis, an offset member pivotally attached to the support member for rotation about, and having a portion extending outwardly from, the primary index axis, a bearing mounted on the outwardly extending portion of the offset member, the bearing defining a secondary index axis spaced apart from and essentially parallel to the primary index axis, a guide support member attached to the bearing for rotation in a plane essentially perpendicular to the secondary index axis, and guide members disposed on the guide support member for supporting and guiding work pallets; and the adaptation including the primary index axis being offset from a first side of the front of the machine tool work table, thereby permitting a combination of a rotation of the offset member about the primary index axis and the location of the primary index axis with respect to the guide support member to define an exchange position in front of the machine tool work table and a setup position away from the machine tool work table, whereby offsetting the primary index axis from a first side of the front of a machine tool work table, and rotating the guide support member from the exchange position into the setup position creates an open region in front of the machine tool work table sufficient to permit a machine tool operator to occupy the space for monitoring the operation of the machine tool.

2. The manually operated work pallet changer combination as set forth in claim 1 wherein the support member includes a static base mount having an upwardly extending shaft defining the primary index axis.

3. The manually operated work pallet changer combination as set forth in claim 2, wherein the static base mount is floor supported and is adapted for supporting and stabilizing the upwardly extending shaft in an essentially vertical orientation.

4. The manually operated work pallet changer combination as set forth in claim 3 wherein the static base mount is massive, and thereby better adapted for its intended purpose.

5. The manually operated work pallet changer combination as set forth in claim 2, wherein the static base mount is adapted for attachment to a machine tool for supporting and stabilizing the upwardly extending shaft in an essentially vertical orientation.

6. The manually operated work pallet changer combination as set forth in claim 2, wherein the offset member includes:

a rotating base member pivotally engaging the upwardly extending shaft for rotation about the primary index axis; and a primary support member attached to the rotating base member in a plane essentially perpendicular to the primary index axis, the primary support member providing the outwardly extending portion of the offset member.

7. The manually operated work pallet changer combination as set forth in claim 6, wherein the rotating base member, the primary support member and the attachment between said members are sufficiently rigid to maintain the outwardly extending portion essentially perpendicular to the primary index axis.

8. The manually operated work pallet changer combination as set forth in claim 6, further including a brace member extending between a lower end of the rotating base member and the outwardly extending portion for maintaining said outwardly extending portion essentially perpendicular to the primary index axis.

9. A manually operated work pallet changer, comprising:
   a support member including a static base mount having an upwardly extending shaft defining a primary index axis;
   an offset member pivotally attached to the support member for rotation about, and having a portion extending outwardly from, the primary index axis;
   the offset member including a rotating base member pivotally engaging the upwardly extending shaft permitting the rotation about the primary index axis, and a bearing mounted on the outwardly extending portion of the offset member, the bearing defining a secondary index axis spaced apart from and essentially parallel to the primary index axis;
   a guide support member attached to the bearing for rotation in a plane essentially perpendicular to the secondary index axis; and a primary support member attached to the rotating base member in a plane essentially perpendicular to the primary index axis, the primary support member providing the outwardly extending portion of the offset member;
   the primary support member being essentially square in the horizontal plane and being attached to an upper end of the rotating base member near one corner of the square, and wherein the static base mount has a support portion, and said one corner does not extend from the primary index axis beyond said support portion, whereby when the support portion is placed immediately adjacent to an object, said one corner will avoid the object as the primary support member is rotated about the primary index axis; and
   guide members disposed on the guide support member for supporting and guiding work pallets.

10. The manually operated work pallet changer as set forth in claim 9, wherein the bearing defining the secondary index axis is located near the center of the square primary support member.

11. The manually operated work pallet changer as set forth in claim 10, wherein the guide support member is essentially congruent with the size and shape of the primary support member and is attached to the bearing for rotation about the secondary index axis.

12. The manually operated work pallet changer as set forth in claim 11, further including a plurality of load bearing members disposed around the bearing on the primary support member for supporting and stabilizing the guide support member.

13. The manually operated work pallet changer as set forth in claim 10, wherein two guide members are disposed along opposed sides of the square guide support member.

14. The manually operated work pallet changer as set forth in claim 13, wherein the two guide members are disposed for pallet transfer at 180° rotation about the secondary index axis.

15. A work pallet indexing system, comprising:
   a manually operated work pallet indexer adapted for use with a machine tool, and including,
      a base,
      an offset member pivotally connected with the base and defining a primary indexing axis through the base,
      a bearing disposed on the offset member and defining a secondary indexing axis essentially parallel with the primary axis,
      a pallet guide support member attached to the offset member at the bearing and rotatable around the secondary axis in a plane essentially perpendicular to the secondary indexing axis, and
      a pair of work pallet guides placed on the guide support member and aligned on opposite sides of the secondary indexing axis so that a rotation of the guide support member by 180° moves one work pallet guide into the position previously occupied by the other work pallet guide;
   an air-bearing work pallet receiver, including
      a body having a planar surface,
      a plurality of small openings in the planar surface,
      means for ejecting a compressed gas through the plurality of small openings and defining an air-bearing at the planar surface,
      a deployable clamping plate disposed on the planar surface and movable between a receiving position and a clamping position,
      means for moving the deployable clamping plate between the receiving and the clamping positions, and
      a pair of locating pins and means for retracting the locating pins into the receiver and below the planar surface, and means for extending the locating pins above the planar surface;
   a machine tool having a work table and a front side defining a front of the work table, and
   the adaptation including the primary indexing axis being offset from a first side of the front of the machine tool work table, thereby permitting a combination of a rotation of the offset member about the primary indexing axis and the location of the primary indexing axis with respect to the pallet guide support member to define an exchange position in front of the machine tool work table and a setup position away from the machine tool work table,
   whereby offsetting the primary indexing axis from the first side of the front of the machine tool work table, and rotating the pallet guide support member from the exchange position into the setup position creates an open region in front of the machine tool work table sufficient to permit a machine tool operator to occupy the space for monitoring the operation of the machine tool.

16. The work pallet indexing system as set forth in claim 15, further comprising:
   at least one work pallet, having
      a mating planar surface for interfacing with the air-bearing surface of the work pallet receiver, an opening in the mating planar surface adapted for compatibly engaging the deployable clamping plate for guiding the work pallet onto the work pallet receiver, for retaining the work pallet against the air-bearing, and for cooperating with the deployable clamping plate for clamping the work pallet against the receiver planar surface, and locating pin openings in the mating planar surface adapted for compatibly receiving the extended locating pins.

17. The work pallet indexing system as set forth in claim 16, further comprising:

a guide bridge attached to the work pallet receiver body.

18. The work pallet indexing system as set forth in claim 16, further comprising:

a temporary work pallet guide bridge for connecting one of the work pallet guides to the air-bearing work pallet receiver.

* * * * *